United States Patent [19]

Yamaguchi

[11] Patent Number: 5,682,270
[45] Date of Patent: Oct. 28, 1997

[54] LIGHT REFLECTING AND ACCUMULATING MEMBER

[75] Inventor: Shoji Yamaguchi, Osaka, Japan

[73] Assignee: Kabushiki Kaisha Yamaguchi Kaisha, Osaka, Japan

[21] Appl. No.: 555,097

[22] Filed: Nov. 8, 1995

[30] Foreign Application Priority Data

| Nov. 8, 1994 | [JP] | Japan | 6-300361 |
| Aug. 18, 1995 | [JP] | Japan | 7-233401 |

[51] Int. Cl.$^6$ .................. G02B 7/182; G02B 5/12
[52] U.S. Cl. .......... 359/871; 359/515; 359/516; 359/519
[58] Field of Search .................. 359/515–519, 359/520, 527, 528, 546, 871

[56] References Cited

U.S. PATENT DOCUMENTS

| 2,360,516 | 10/1944 | Schmidling | 250/462.1 |
| 2,502,535 | 4/1950 | Richards | 359/519 |
| 2,542,894 | 2/1951 | Blanchard | 359/515 |
| 3,871,336 | 3/1975 | Bergman | 359/516 |
| 3,901,579 | 8/1975 | Demerest | 359/519 |
| 4,712,319 | 12/1987 | Goria | 359/515 |
| 5,193,026 | 3/1993 | Purvis et al. | 359/516 |

FOREIGN PATENT DOCUMENTS

| 17800 | 10/1992 | European Pat. Off. | 359/515 |

*Primary Examiner*—Paul M. Dzierzynski
*Assistant Examiner*—Mohammad Y. Sikder
*Attorney, Agent, or Firm*—Birch, Stewart, Kolasch & Birch, LLP

[57] ABSTRACT

A light reflecting and accumulating member includes a reflecting member, an accumulating member, and a stopping member. The reflecting member has an accumulating member mounting part sunk from the surface, and a reflecting area on the entire circumference of the accumulating member mounting part on the face side, and a stopping member mounting part sunk from the back side, on the back side. By adhering the accumulating member to the accumulating member mounting part, the peripheral edge of the accumulating member sinks from the surface of the reflecting member. The stopping member has a stopping piece for detachably fixing to the member to be mounted, and a connection piece, and by adhering the connection piece to the stopping member mounting part of the reflecting member, the peripheral edge of the connection piece sinks from the back side of the reflecting member.

18 Claims, 11 Drawing Sheets

LIGHT REFLECTING AND ACCUMULATING MEMBER

BACKGROUND OF THE INVENTION

The present invention relates to a light reflecting and accumulating member used for traffic safety, disaster prevention, etc., including a reflecting area capable of reflecting light by projecting a ray of light, and an accumulating area for absorbing and accumulating the received light, and also capable of emitting light by gradually releasing the accumulated light.

When a light reflecting member designed to reflect light from a ray of light projected from an automobile lamp or the like is worn on the body or attached to belongings, the light reflecting member is easily recognized from a car or the like even in darkness, and safety may be guaranteed. Accordingly, today, light reflecting members are used for traffic safety. With todays light reflection member, however, the existence of the light reflection member can be recognized only when a ray of light is projected to the light reflecting member. When the reflection plane of the light reflecting member is deviated from the light running direction, the reflection efficiency is poor, and it is hard to recognize the existence of the light reflecting member from a car or the like. Further, the light reflecting member itself does not emit light, and the user, when wearing it on the body, does not know visually whether it can be immediately recognized from a car or the like, and, as a result, few people are willing to wear such light reflecting members at the present.

OBJECTS OF THE INVENTION

The invention is devised in light of the above circumstance, and it is a first object thereof to present a light reflecting and accumulating member allowing the existence thereof to be recognized easily even in darkness if the reflection efficiency of the reflection area is poor, and encouraging the user to wear the light reflecting and accumulating member willingly.

It is a second object of the invention to present a light reflecting and accumulating member in which the accumulating member is adhered to the reflecting member with an adhesive making it difficult to peel off the accumulating member from the reflecting member.

It is a third object of the invention to present a light reflecting and accumulating member in which an attachment device is adhered to the reflecting member with an adhesive.

BRIEF SUMMARY OF THE INVENTION

The invention solves the problems by presenting the light reflecting and accumulating member possessing the following features.

A first aspect of the invention comprises a reflecting area 31a capable of reflecting light by projecting a ray of light at least to part of the surface, and an accumulating area 42 for absorbing and accumulating the received light, and also capable of emitting light by gradually releasing the accumulated light.

A second aspect of the invention comprises a reflecting member 3 having a reflecting area 31a capable of reflecting light by projecting a ray of light at least to part of the surface, and an accumulating member 4 having an accumulating area 42 for absorbing and accumulating the received light, and also capable of emitting light by gradually releasing the accumulated light.

An accumulating member mounting part 31b is provided on the surface of the reflecting member 3, being formed so as to be sunk from the surface, and the reflecting area 31a is provided at the side of the accumulating member mounting part 31b.

The back side of the accumulating member 4 is attached to the accumulating member mounting part 31b of the reflecting member 3, and thereby the peripheral edge 45 of the accumulating member sinks from the surface of the reflecting member 3 over the entire circumference or perimeter.

A third aspect of the invention relates to the second aspect, in which the entire surface of the accumulating member 4 is covered with a transparent body 9.

The transparent body 9 is composed of a material having a wider surface area than the accumulating member 4, and the periphery of the transparent body 9 is provided on the reflecting member 3 so that the accumulating member 4 may not be peeled off the accumulating member mounting part 31b of the reflecting member 3.

A fourth aspect of the invention relates to the second or the third aspect, in which the accumulating member 4 is composed of a plate body 8 and a part having the accumulating area 42 on the surface of the plate body 8. The lower side of the plate body 8 is fitted to the accumulating member mounting part 31b of the reflecting member 3, so that the lover end of the peripheral edge 45 in the plate body 8 sinks from the surface of the reflecting member 3 over the entire circumference or perimeter.

A fifth aspect of the invention relates to the first or the second aspect, in which an attachment device, or stopping means, 2 for detachably attaching the light reflecting and accumulating member to the member to be mounted is provided at the back side of the reflecting member.

The back side of the reflecting member 3 is sunk from its back side to form an attachment member mounting part, or stopping member mounting part, 31c.

The an attachment device, or stopping means, 2 is composed of an attachment device, or stopping piece, 22 for detachably attaching the light reflecting and accumulating member to and object on which it is to be mounted. The attachment device 2 further includes a connection piece 21a to be connected to the reflecting member 3, and this connection piece 21a is fitted to the stopping member mounting part 31c of the reflecting member 3 so that the peripheral edge 21b of the connection piece 21a sinks from the back side of the reflecting member 3 over the entire circumference.

A sixth aspect of the invention comprises a reflecting member 3 having a reflecting area 31a capable of reflecting light by projecting a ray of light at least to part of the surface, an accumulating member 4 having an accumulating area 42 for absorbing and accumulating the received light, and also capable of emitting light by gradually releasing the accumulated light, and a plate-shaped mounting member 10.

The reflecting member 3 has a penetration hole 31d penetrating from the surface to the back side.

The back side of the accumulating member 4 is fitted to the periphery of the penetration hole 31d.

One side of the mounting member 10 is fitted to the periphery of the penetration hole 31d at the back side of the reflecting member 3, and is also fitted to the back side of the accumulating member 4 fitted to the reflecting member 3 through the penetration hole 31d.

A seventh aspect of the invention comprises a reflecting member 3 having a reflecting area 31a capable of reflecting light by projecting a ray of light at least to part of the surface, an accumulating member 4 having an accumulating area 42 for absorbing and accumulating the received light, and also capable of emitting light by gradually releasing the accumulated light, and a plate-shaped mounting member 10.

An accumulating member mounting part 31b is provided on the surface of the reflecting member 3, being formed so as to be sunk from the surface, and the reflecting area 31a is provided at the side of the accumulating member mounting part 31b.

The accumulating member mounting part 31b is provided with a penetration hole 31d penetrating from the surface to the back side, with an edge 31e formed on the periphery of the penetration hole 31d.

The back side of the accumulating member 4 is fitted to the edge 31e of the accumulating member mounting part 31b so as to sink from the surface of the reflecting member 3 over the entire circumference.

One side of the mounting member 10 is fitted to the periphery of the penetration hole 31d at the back side of the reflecting member 3, and is also fitted to the back side of the accumulating member 4 fitted to the accumulating member mounting part 31b through the penetration hole 31d.

Further scope of applicability of the present invention will become apparent from the detailed description given hereinafter. However, it should be understood that the desired description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Referring now to the drawings, some of the preferred embodiments of the invention are described in detail below.

Figure 1:
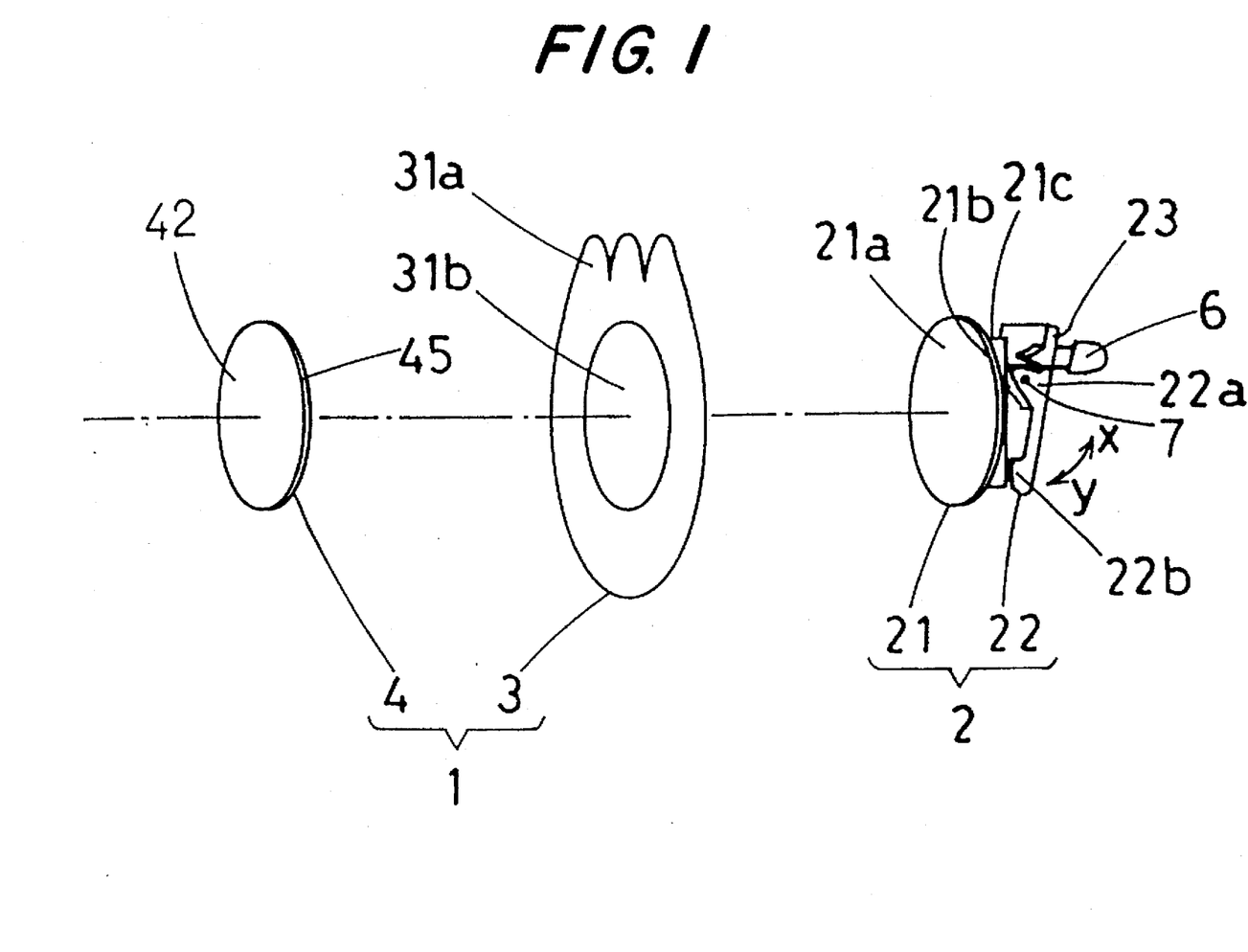
FIG. 1 is a perspective exploded view of an embodiment of the invention.

FIG. 1 is a perspective exploded view of an embodiment of a light reflecting and accumulating member of the invention.

The light reflecting and accumulating member of the invention comprises a reflecting area 31a and an accumulating area 42. In the embodiment, it is composed of a main body 1 possessing the reflecting area 31a and accumulating area 42, and a stopping member, or attachment device, 2.

Figure 2:
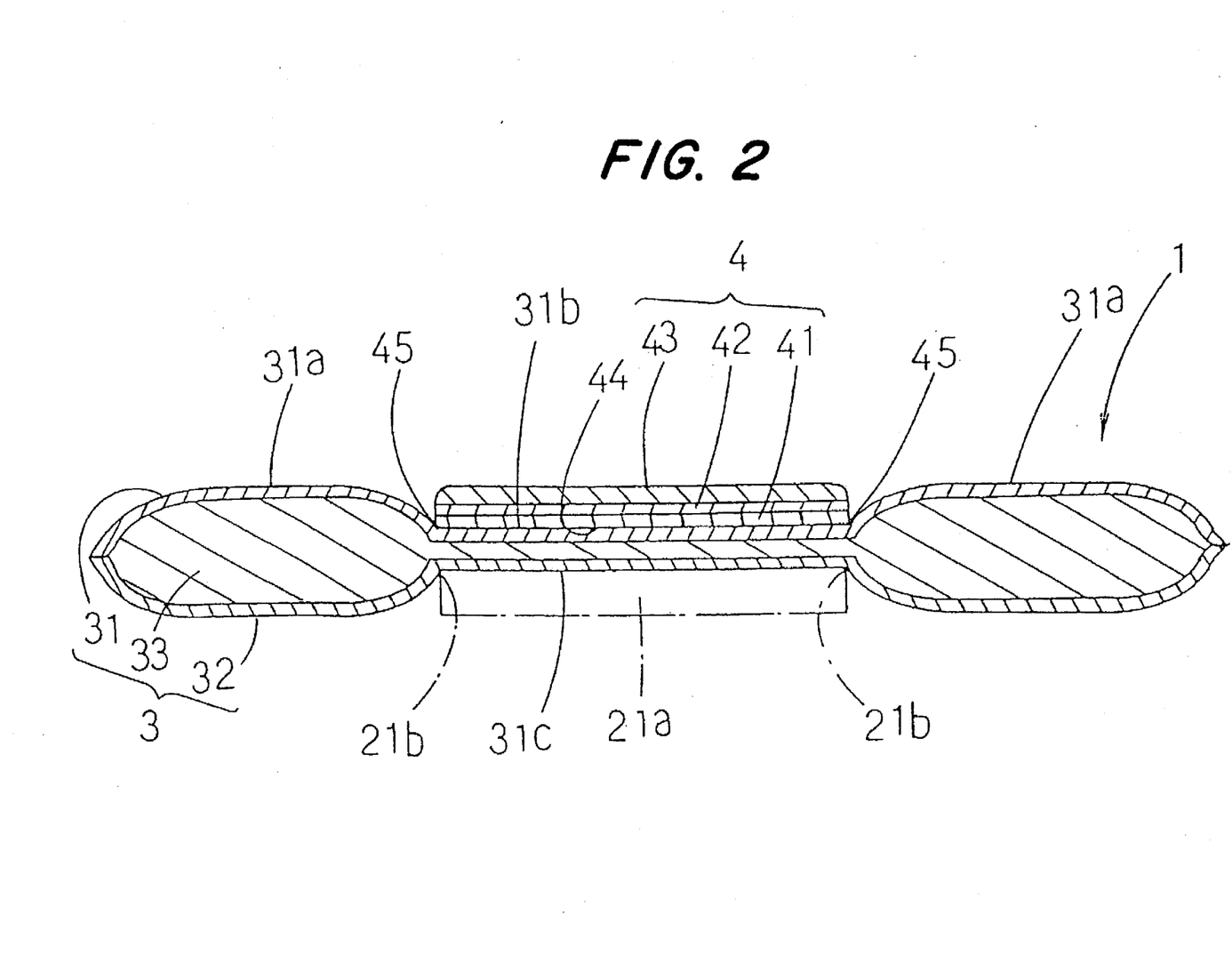
FIG. 2 is a sectional view through a midline extending through a light reflecting and accumulating member according to a first embodiment.
Figure 3:
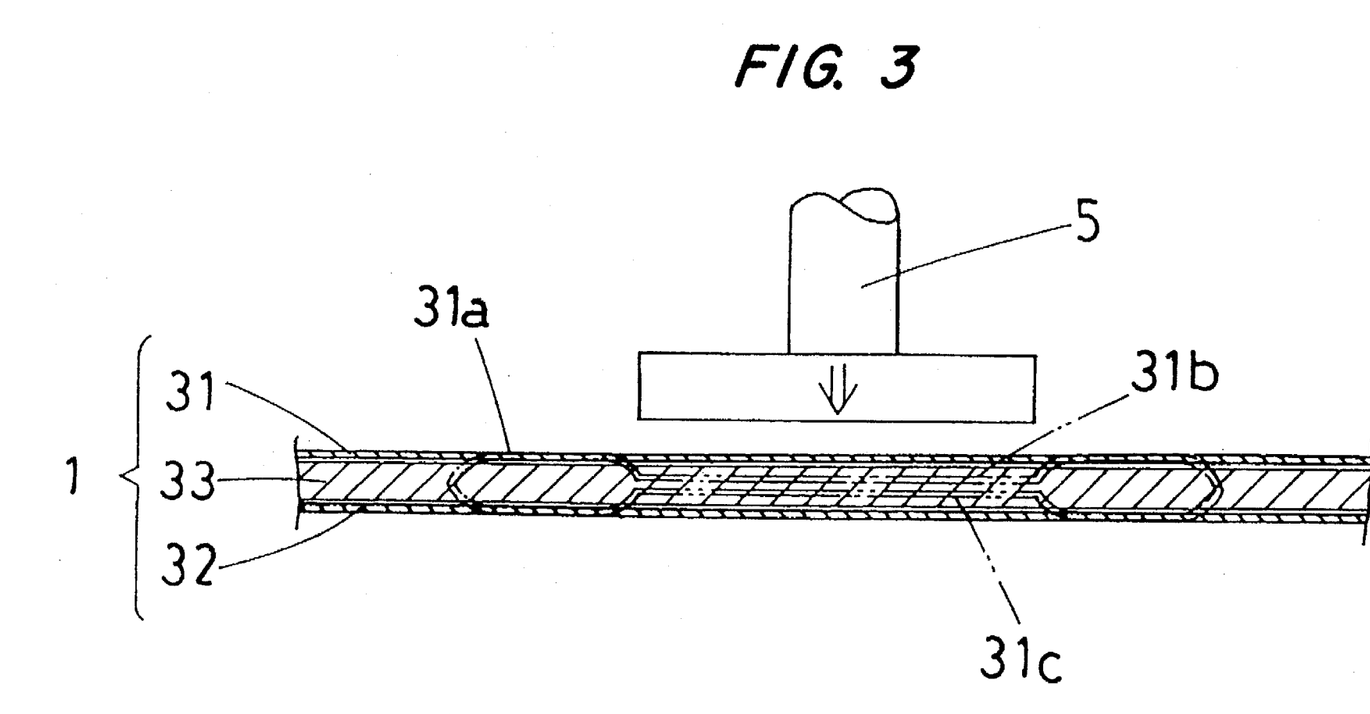
FIG. 3 is a sectional explanatory diagram of forming a reflecting member.

The main body 1 includes a reflecting member 3 and an accumulating member 4 separate from the reflecting member 3. The reflecting member 3 is, as shown in FIG. 2 and FIG. 3, composed of face and back sheet members 31, 32 having the mutual peripheral parts adhered together, and an elastic member 33 made of sponge interposed between them. On the face side sheet member 31, the reflecting area 31a capable of emitting light as being exposed to a ray of light is formed on the entire surface of a soft vinyl chloride sheet. The reflecting area 31a in the embodiment employs the recurrent reflection system by microprism method in which the incident light bounces on three sides of a prism to reflect in the incident directions by forming a prism layer by disposing a plurality of microprisms composed of pyramids on a soft vinyl chloride sheet. Incidentally, this reflecting area 31a is not limited to the recurrent reflection system by the microprism method, but it may be also realized, for example, by the recurrent reflection system by glass beads method of disposing glass beads in parallel rows, collecting the incident light in the rear surface, and passing again through the beads, and reflecting in the incident direction. The back side sheet member 32 is composed of a soft vinyl chloride sheet.

In the middle of the face side of the reflecting member 3, an accumulating member mounting part 31b for mounting the accumulating member 4 is provided and in the middle of the back side, an attachment member mounting part, or stopping member mounting part, 31c for mounting the stopping member 2 is provided. They are circular, and sunk from the face and back sides of the reflecting member 3.

In the embodiment, the reflecting member 3 is formed as follows. Firsts as shown in FIG. 3, an elastic member 33 is put on a soft vinyl chloride sheet as the back side sheet member 32, and further thereon is mounting a soft vinyl chloride sheet forming the face side sheet member 31 forming the reflecting area 31a on the upper side. Moreover, a circular section die 5 kept at high temperature is pressed to the upper surface of forming the reflecting area 31a from the upper side. At this times since the upper and lover sheet members 31, 32 and elastic member 33 are made of heat susceptible materials, the portions contacting with the die 5 in the pressing process of the die 5 are affected by heat, and the elastic member 33 is compressed, and the elastic-member 33 in compressed state, and the upper and lower sheet members 31, 32 adhere within the range of contacting area with the die 5. As a result, the portion of the face side sheet member 31 contacting with the die 5 sinks in a circular form, and in the same range as the sunk portion, the back side sheet member 32 is pulled to the upper side, and thereby the accumulating member mounting part 31b and stopping member mounting part 31c are formed. Incidentally, the depth of the accumulating member mounting part 31b and stopping member mounting part 31c can be adjusted by the thickness of the elastic member 33. Or, when pressed by the die 5, in the accumulating member mounting part 31b contacting with the die 5, the reflecting area 31a is broken. Therefore, the other portion than the accumulating member mounting part 31b on the surface of the face side sheet member 31 forms the reflecting area 31a. By thus forming the accumulating member mounting part 31b and stopping member mounting part 31c, they can be formed simultaneously by one operation of pushing the die 5 heated to specified temperature from the upper side.

Next, by adhering and cutting the peripheral parts of the accumulating member mounting part 31b of the upper and lower sheet members 31, 32 in specified size and shape, a reflecting member 3 made of a soft material formed in a proper outline shape is obtained. This outline may be formed before forming the accumulating member mounting part 31b, etc.

The accumulating member 4 is made in a circular form in a size just fitted into the accumulating member mounting part 31b of the reflecting member 3, and, as shown in FIG. 2, it is composed of an accumulating layer 42 formed on the entire surface of the soft vinyl chloride sheet 41, a UV resin layer 43 covering the entire surface of the accumulating layer 42, and an adhesive layer 44 formed on the entire back side of the soft vinyl chloride sheet 41. The accumulating layer 42 forms the accumulating area, and is formed by adhering an accumulating pigment having properties of absorbing and accumulating light such as sunlight and fluorescent lamp light, and emitting light by releasing gradually in darkness, and light absorption, accumulation, and emission are done repeatedly. The kind of accumulating pigment is not specified, but materials capable of emitting light for a long time after accumulating are preferred. Incidentally, the accumulating layer 42 may not be always formed on the soft vinyl chloride sheet 41, but may be properly formed, for example, on a hard vinyl chloride sheet, polyester sheet, metal foil, or thin paper. Furthermore, instead of forming the accumulating layer 42 on the soft vinyl chloride sheet 41, for example, a liquid containing an accumulating pigment may be directly poured into the accumulating member mounting part 31b of the reflecting member 3, and solidified, and in this case since the accumulating member mounting part 31b is sunk from the surface of the reflecting member 3, it can be poured into the accumulating member mounting part 31b, and, by solidification, it can be easily formed into the shape of the accumulating member mounting part 31b. The accumulating layer 42 is a thin layer as compared with the thickness of the soft vinyl chloride sheet 41, but for the convenience of explanation, in the drawing, it is expressed nearly in the same thickness as the soft vinyl chloride sheet 41. It is the same in the other drawings.

The UV resin layer 43 is a transparent UV resin liquid poured on the surface of the accumulating layer 42 and solidified, and it adheres to and covers the entire surface of the accumulating layer 42 to protect the accumulating layer 42. This UV resin layer 43, if transparent, can function with the accumulating layer 42 through the UV resin layer 43, and although the type is not particularly specified, in this embodiment, a UV resin having a large surface tension when poured onto the surface of the accumulating layer 42 in viscous state is used, for example, polyester and acrylic UV resins and it gradually builds up from the periphery to the center due to surface tension when pouring, so that the periphery has a roundness over the entire circumference. This UV resin layer 43 is provided as required, and may not be always provided. The adhesive layer 44 is to adhere the accumulating member 4 to the reflecting member 3, and it is not always furnished to the accumulating member 4, but an adhesive may be used separately to adhere them.

In the accumulating member 4, as shown in FIG. 2, the adhesive layer 44 is fitted to the accumulating member mounting part 31b of the reflecting member 3, and is disposed in the middle of the upper surface of the reflecting member 3. In the state adhering to the accumulating member mounting part 31b, the peripheral edge 45 of the accumulating member 4 is sunk to the lower side from the surface of the reflecting member 3. When the accumulating member 4 is adhered to the surface of the reflecting member 3 having a flat plane, the peripheral edge 45 of the accumulating member 4 projects from the surface, and in use, therefore, other parts may be caught in the peripheral edge 45 to be likely to be peeled off the peripheral edge 45. However, as stated above, by sinking the peripheral edge 45 of the accumulating member 4 to the lower side from the surface of the reflecting member 3, other parts are not caught by the peripheral edge 45 during use, so that the accumulating member 4 is hardly peeled off the reflecting member 3. Moreover, by the peripheral roundness of the UV resins the entire periphery of the accumulating member 4 interferes with other parts, and peeling hardly occurs. In addition, by the UV resin, the accumulating member 4 and reflecting member 3 are nearly the same in height, and the appearance is superior, and hence the commercial value is high. If the accumulating layer 42 is exposed, it may be flawed, or when the accumulating layer 42 is exposed to light, it may deteriorate, but by covering the entire surface with UV resin, flawing is prevented, and lowering of light absorbing, accumulating and emitting function of the accumulating layer 42 due to invasion of water can be prevented, and the initial state can be maintained for a long time.

The stopping member 2 is stopping means for detachably stopping the main body 1 to the member to be mounted, such as part of body, bicycle, clothes, shoes, or umbrella, and in this embodiment the stopping member 2 comprises, as shown in FIG. 1, a connection part 21 to be connected to the main body 1, and a stopping piece 22.

The connection part 21 has a connection piece 21a provided in the front part, and a stopping piece mounting part 21c for mounting the stopping piece 22 in the rear part. The connection piece 21a is formed in a disk in a size approximately fitting into the stopping member mounting part 31c of the reflecting member 3, and is adhered to the stopping member mounting part 31c with adhesive. The thickness of the connecting piece 21a is thin, about 0.5 mm.

The stopping piece 22 is a plate body, and comprises an operation area 23 at the upper end of the rear part. On the other hand, in the upper part of the front of the stopping piece 22, there is a bearing 22a borne on the stopping piece mounting part 21c of the connection part 21, and a pinching part 22b for pinching the member to be mounted together with the back side of the connection part 21 is provided in the lower part. The bearing 22a is borne on a shaft pin 7 penetrating through the stopping piece mounting part 21c of the connection part 21 and the bearing 22a, and the pinching part 22b is designed to rotate in the vertical direction (X-Y direction in the drawing). The bearing 22a is also provided with a coil spring (not shown), and the pinching part 22b is always thrust by this coil spring in the direction of connection part 21 (Y direction in the drawing), so that the member to be mounted is held between the back side of the connection part 21 and the pinching part 22b. In this embodiment, moreover, the stopping piece 22 is provided with a safety pin 6, so that the main body 1 can be detachably stopped on the member to be mounted also by this safety pin 6.

In this stopping member 2, as the connection piece 21a is adhered to the stopping member mounting part 31c of the main body 1 with adhesive, the stopping member 2 and main body 1 are connected. In the connected state of the two, the thickness of the connection piece 21a is thin, about 0.5 mm, and the stopping member mounting part 31c is sunk as mentioned above, and therefore same as in the case of the accumulating member 4, the peripheral edge 21b of the connection piece 21a is hardly caught on other objects, and the connection piece 21a is hardly peeled off the stopping member mounting part 31c.

Being thus constituted, for example, when the light reflecting and accumulating member of the invention is worn on the body, when the light of an automobile is projected to the reflecting area 31a in the night, the light is reflected, and the reflecting and accumulating member is easily recognized from the automobile.

If the light is not projected from the front of the reflecting area 31a and the reflection efficiency is poor, the accumulating area 42 emits the accumulated light, and hence the existence can be easily recognized. It is therefore suited for traffic safety. On the other hands since the accumulating part 42 emits light by itself, the user instantly knows by looking at it that the safety from the vehicle is guaranteed by wearing it, and the user is willing to wear it for traffic safety. As a result, the frequency of use for traffic safety increases, and it is suited for traffic safety.

On the other hand, since the accumulating area emits the accumulated light, and the existence can be easily recognized even in darkness, and by attaching it to, for example, a fire alarm or fire extinguisher, it can be seen in the darkness and the position of the fire alarm or fire extinguisher can be known, which is suited for disaster prevention. Moreover, by attaching the light reflecting and accumulating member to precious articles, the position can be easily known in the darkness, which is very convenient.

Other embodiments are described below.

Figure 4:
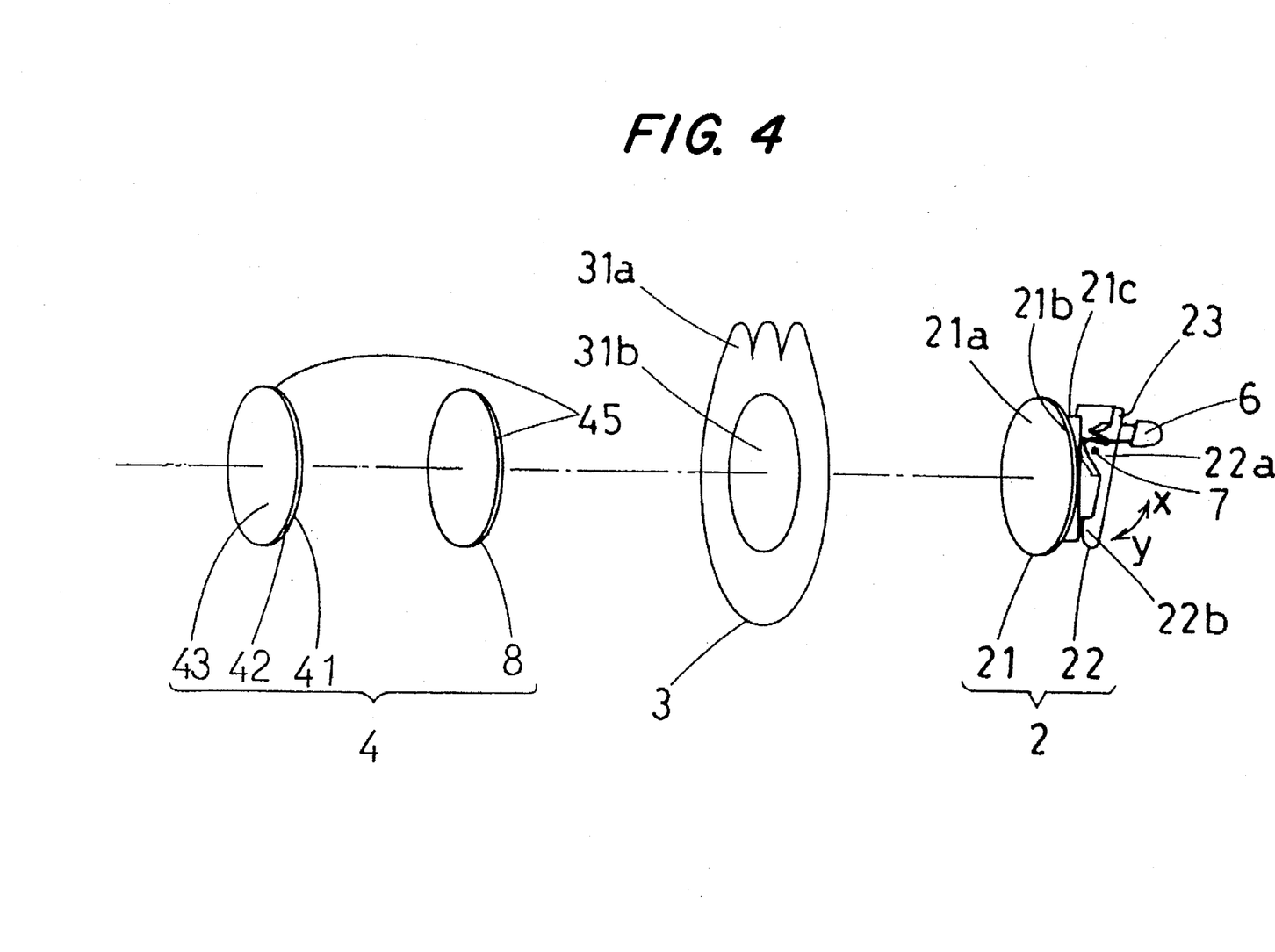
FIG. 4 is a perspective exploded view of a second embodiment.
Figure 5:
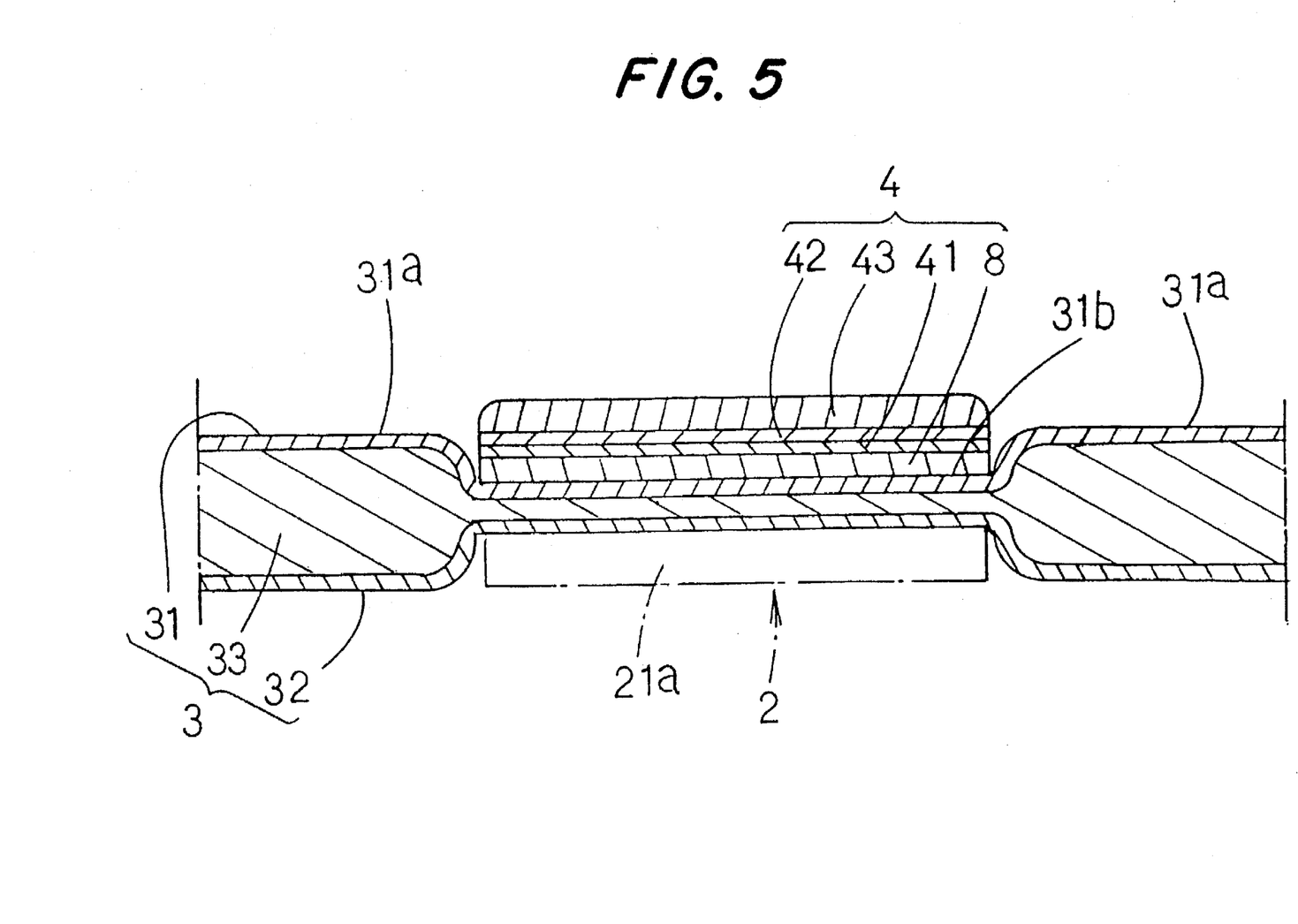
FIG. 5 is an essential sectional view through a midline extending through a light reflecting and accumulating member according to the second embodiment.

FIG. 4 relates to a second embodiment, which comprises, a reflecting member 3, an accumulating member 4, and a stopping member 2, and the reflecting member 3 and stopping member 2 are constituted in the same manner as in the preceding embodiment, but the accumulating member 4 has a plate body 8. More specifically, as shown in FIG. 5, the accumulating member 4 comprises an accumulating layer 42 formed on the entire surface of a soft vinyl chloride sheet 41, an UV resin layer 43 covering the entire surface of the accumulating layer 42, and a plate body 8 adhered to the entire back side of the soft vinyl chloride sheet 41. This plate body 8 is composed of a hard synthetic resin such as polycarbonate, or a metal plate. The back side of the plate body 8 is adhered to the accumulating member mounting part 31b of the reflecting member 3. As in the former embodiment, when the accumulating member 4 is composed by forming the accumulating layer 42 on the surface of the soft vinyl chloride sheet 41, and it is adhered directly to the reflecting member 3, since the reflecting member 3 is also composed of soft vinyl chloride sheet, the adhesion by the adhesive is poor, and the accumulating member 4 is easily peeled off. Still worse, after adhesion, the reflecting member 3 is likely to be bent, and when the adhered reflecting member 3 is bent, peeling is likely to occur from the periphery of the accumulating member 4. Accordingly, as in this embodiment, when the plate body 8 made of hard synthetic resin or metal is interposed between soft vinyl chloride sheets, adhesion by adhesive is improved, and bending after adhesion is prevented, so that peeling from periphery due to bending can be prevented. In addition, by providing the accumulating member 4 with the plate body 8, together with the connection piece 21a of the stopping member 2, bending after adhesion is more difficult, and peeling from the periphery can be prevented. In this embodiment, the accumulating layer 42 is formed on the surface of the soft vinyl chloride sheet 41, but the accumulating layer 42 may be directly printed on the plate body 8. In such a case, soft vinyl chloride sheet 41 is not used, and instead of the UV resin layer 43 for covering the surface of the accumulating layer 42, other transparent resin can be used. When using the soft vinyl chloride sheet 41, if a resin to be used at high temperature is used, the soft vinyl chloride sheet 41 is attacked, and therefore a UV resin solidified at low temperature must be used, but when soft vinyl chloride sheet 41 is not used, a resin which is liquefied at high temperature and solidified at low temperature, for example, epoxy resin may be used to form an epoxy resin layer, and thus the material may be changed appropriately. The thickness of the plate body 8 is not particularly defined, but within a range of about 0.1 to 0.5 mm, it is preferred because it does not particularly project upward from the reflecting member 3, and hardly bends.

Figure 6:
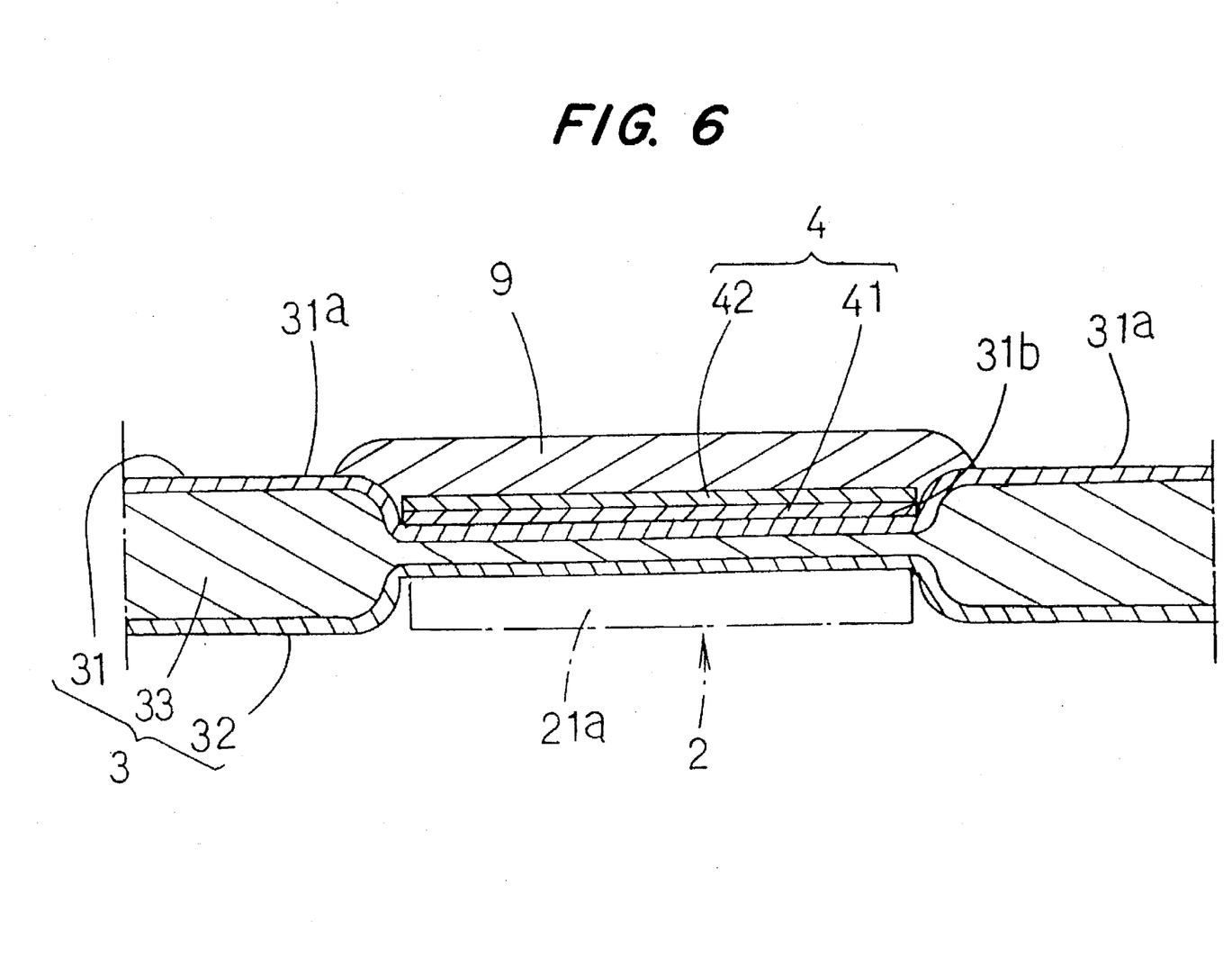
FIG. 6 is an essential sectional view through a midline extending through a light reflecting and accumulating member according to a third embodiment.
Figure 7:
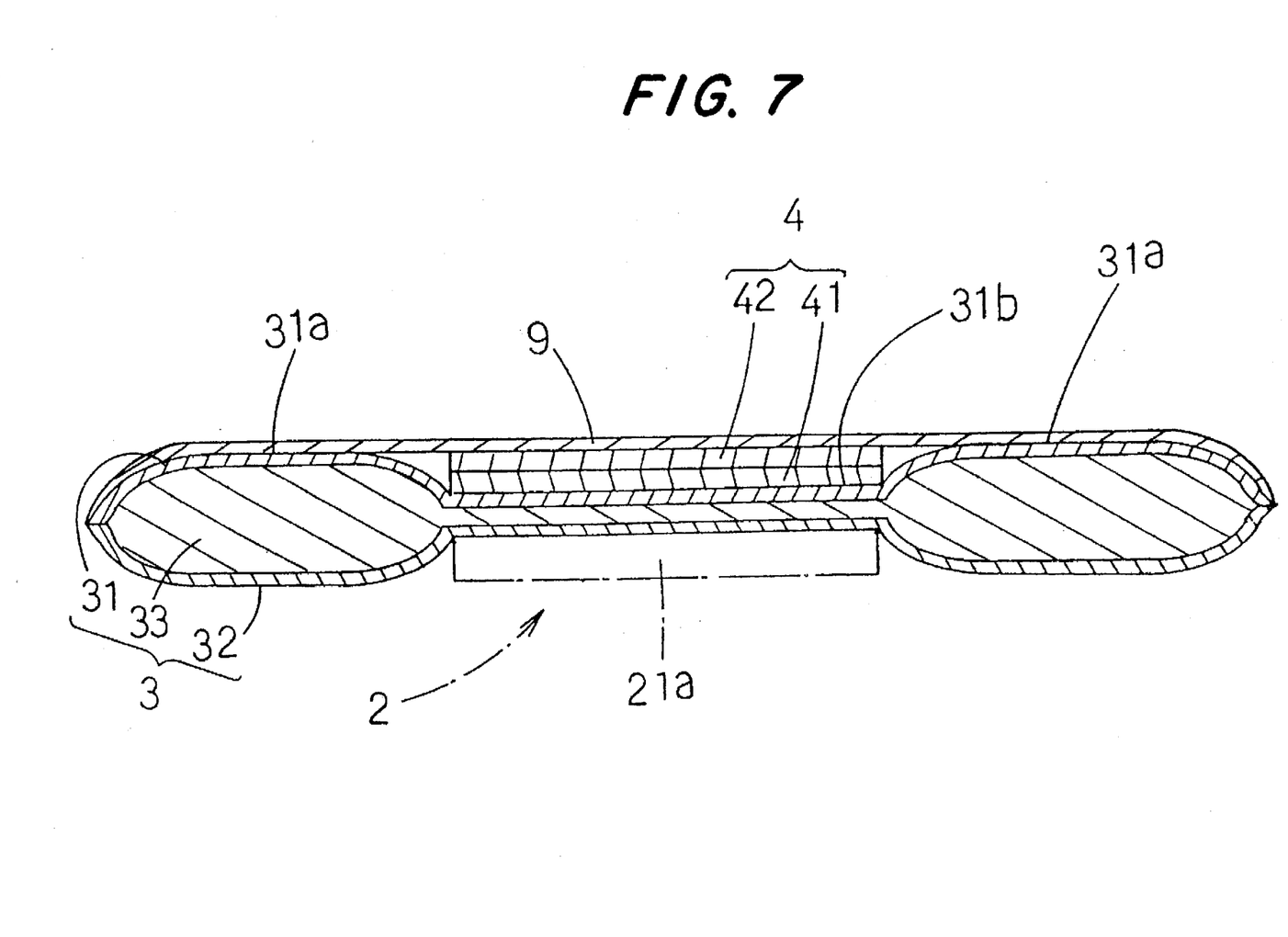
FIG. 7 is an essential sectional view through a midline extending through a light reflecting and accumulating member according to a fourth embodiment.

FIG. 6 and FIG. 7 relate to third and fourth embodiments, in which the entire surface of the accumulating member 4 is covered with a transparent body 9 so that the accumulating member 4 may be hardly peeled off the reflecting member 3, and in the third embodiment shown in FIG. 6, the surface of the accumulating member 4 and part of the surface of the reflecting member 3 are covered with the transparent body 9. In the foregoing embodiments, the surface of the accumulating member 4 is covered with the transparent UV resin 43 or the like and the appearance is excellent, and in this embodiment the transparent body 9 is composed of a material having a wider surface area than the accumulating member 4 to cover the entire surface of the accumulating member 4 and part of the surface of the reflecting member 3, and the appearance is excellent, and the accumulating member 4 is hardly peeled off the reflecting member 3. More specifically, as shown in FIG. 6, the accumulating member 4 having the accumulating layer 42 formed on the surface of the soft vinyl chloride sheet 41 is adhered to the accumulating member mounting part 31b of the reflecting member 3, and the UV resin as the transparent body 9 is poured into the accumulating member 4 and the reflecting member 3 in the periphery of the accumulating member 4, and solidified. Consequently, when the UV resin is solidified, it is adhered to the accumulating member 4 and the reflecting member 3 in the periphery of the accumulating member 4. Therefore, if the adhesion is poor by adhering the accumulating member 4 directly to the reflecting member 3, the accumulating member 4 is hardly peeled off the reflecting member 3 owing to the transparent body 9, and if the accumulating member 4 and reflecting member 3 are likely to bend, peeling of the accumulating member 4 from the periphery due to bending can be prevented.

In the fourth embodiment shown in FIG. 7, the surface of the accumulating member 4 and the entire surface of the reflecting member 3 are covered with a transparent body 9. In this embodiment, the transparent body 9 is composed of a soft vinyl chloride sheet, and the periphery of the transparent body 9 is adhered to the entire periphery of the reflecting member 3. In the adhering method of the transparent body 9, when forming the periphery of the reflecting member 3 by heat fusion, the transparent body 9 is put on the surface of the reflecting member 3, and heat is applied simultaneously to adhere to the periphery of the reflecting member 3, so that the job can be done at once. In these embodiments, since peeling of the accumulating member 4 is prevented by the transparent body 9, the plate body 8 as in the second embodiment is not provided, but it may be also provided.

Figure 8:
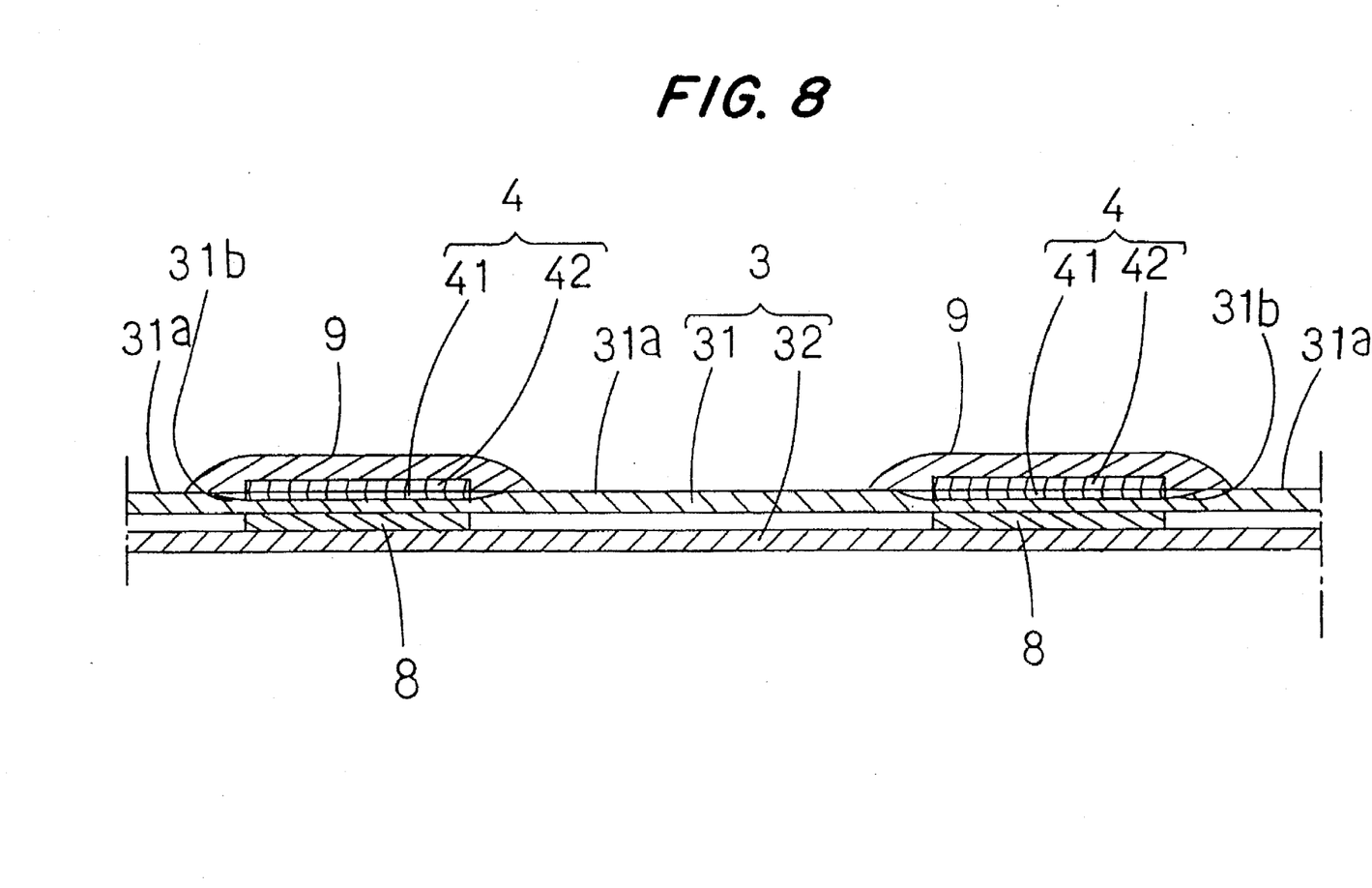
FIG. 8 is an essential sectional view through a midline extending through a light reflecting and accumulating member according to a fifth embodiment.

FIG. 8 relates to a fifth embodiment, in which the entire form of the light reflecting and accumulating member is made in a thin sheet without using elastic member 33. More specifically, the reflecting member 3 is composed of a sheet member 31 made of a soft vinyl chloride sheet having a reflecting area 31a formed on the entire surface, and a sheet member 32 made of a soft vinyl chloride sheet adhered to the back side of the sheet member 31. The face side sheet member 31 is provided with an accumulating member mounting part 31b pressed by a die 5 same as the one shown in FIG. 3 and sunk from the surface. As in the foregoing embodiments, by disposing the elastic member 33 between the sheet members 31 and 32, the depth of the accumulating member mounting part 31b and stopping member mounting part 31c can be formed deep so as to be adjustable, but without using the elastic member 33, by pressing a heated die 5, it is possible to sink, although to a small extent. In this embodiment, a plurality of thus formed accumulating member mounting parts 31b are arranged in parallel vertical or vertical and lateral rows, and a plate body 8 similar to the one shown in FIG. 4 or FIG. 5 is formed in the portion corresponding to the accumulating member mounting part 31b on the back side of each face side sheet member 31, being disposed between the sheet members 31 and 32. The accumulating member 4 is adhered to the accumulating member mounting part 31b. The periphery of the accumulating member 4 and the accumulating member mounting part 31b of the reflecting member 3 is covered with a transparent body 9 of UV resin same as explained in FIG. 6. In this way, peeling of the accumulating member 4 from the reflecting member 3 due to bending is prevented, and peeling from the reflecting member 3 more securely prevented by the transparent body 9.

Figure 9A:
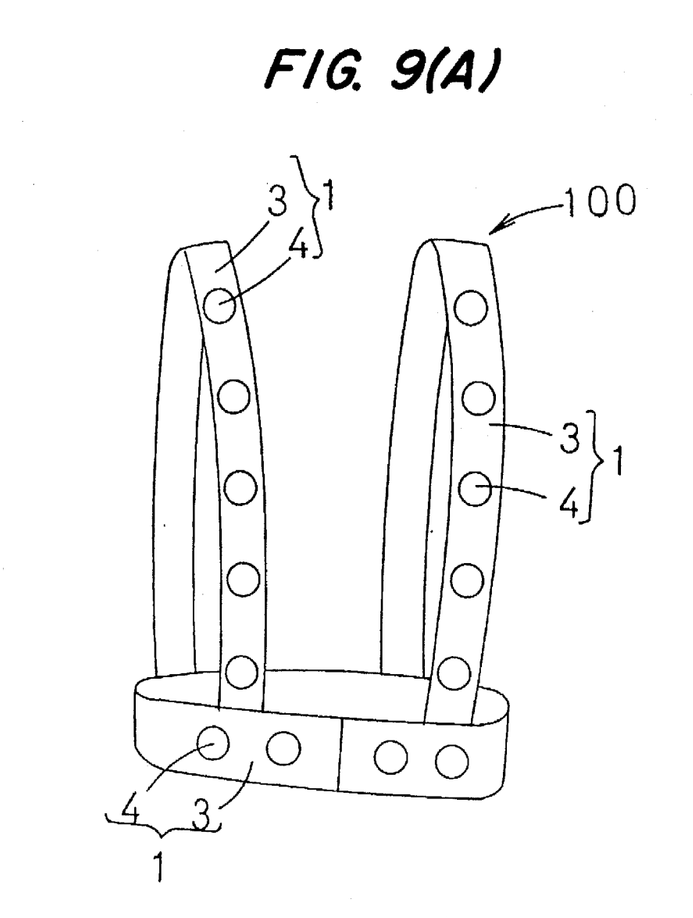
FIG. 9(A) is a front view of suspenders conforming to the fifth embodiment.
Figure 9B:
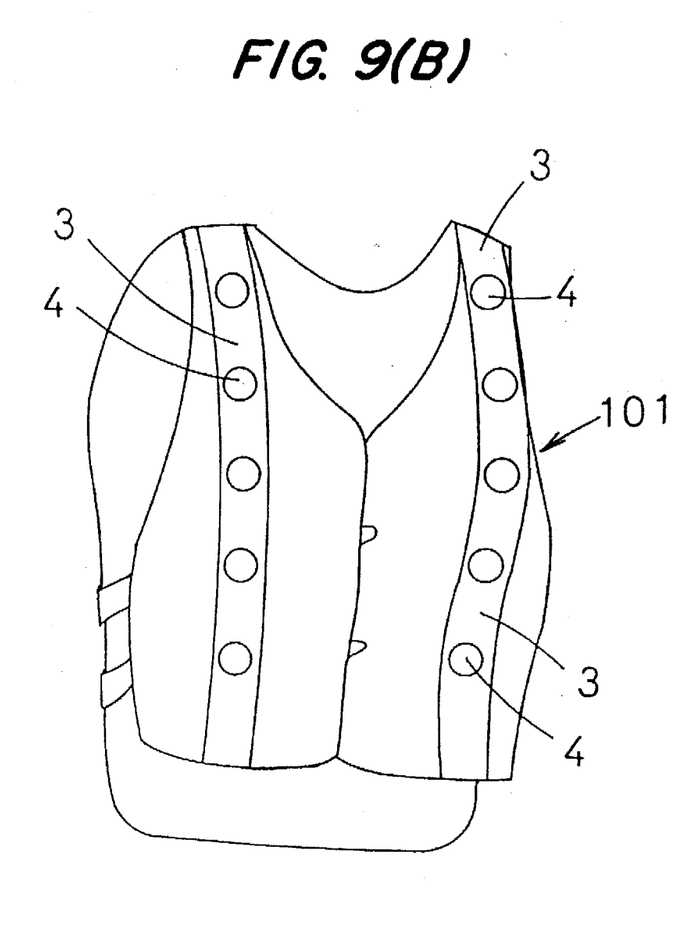
FIG. 9(B) is a front view of a vest conforming to the fifth embodiment.

When the light reflecting and accumulating member of the invention is formed, for example, like suspenders 100 as shown in FIG. 9(A), it can be worn over the clothes, which is well suited for traffic safety. Or when it is sewn directly to the clothes, for example, it can be worn as a vest 101 as shown in FIG. 9(B), which is also suited for traffic safety. Moreover, by cutting to a specific length including one accumulating member 4, furnishing the body ends with stoppers, it can be used as a cap fastener for fixing the cap and clothes. In the embodiment, meanwhile, the plate body 8 may be formed between the accumulating member 4 and the surface of the reflecting member as in the second embodiment, or between the accumulating member 4 and the surface of reflecting member 3 or the back side of the reflecting member 3. Or the plate body 8 may not be provided, and in such a case peeling can be prevented by the transparent body 9.

Figure 10:
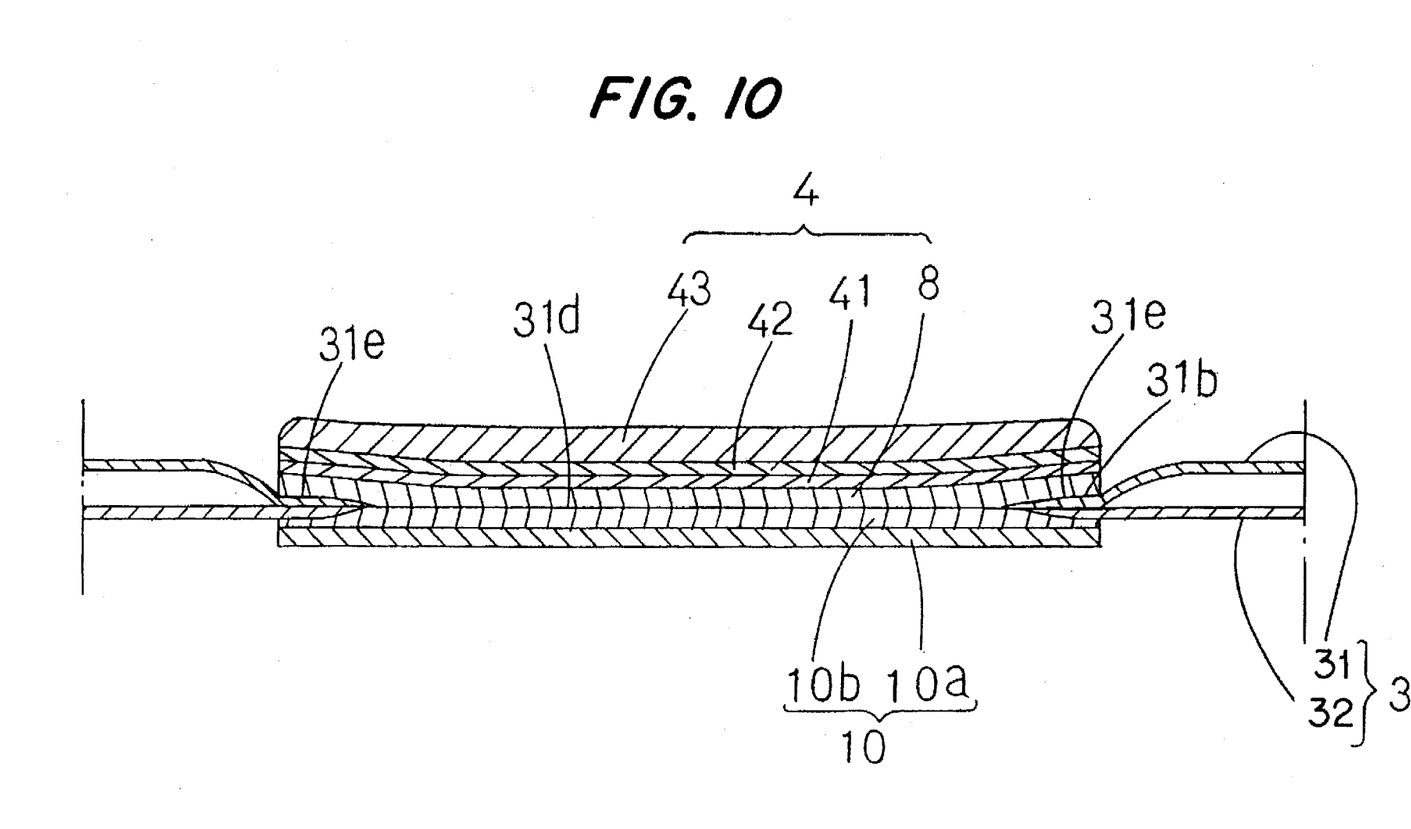
FIG. 10 is an essential sectional view through a midline extending through a light reflecting and accumulating member according to a sixth embodiment.

FIG. 10 relates to a sixth embodiment, in which the constitution comprises a reflecting member 3, an accumulating member 4, and a plate form mounting member 10. The reflecting member 3 is formed of upper and lower sheet members 31, 32 made of soft vinyl chloride, and an accumulating member mounting part 31b sunk from the upper surface is provided on the upper side. The accumulating member mounting part 31b has a penetration hole 31d penetrating to the lower side in the middle, and an edge 31e is formed on the entire circumference of the penetration hole 31d. On the other hand, the accumulating member 4 is formed nearly in the same size as the accumulating member mounting part 31b of the reflecting member 3, and the plate body 8 is adhered to the entire back side of a soft vinyl chloride sheet 41 having an accumulating layer 42 covered with a transparent UV resin 43 on the surface. The mounting member 10 has an adhesive layer 10b of rubber material provided on the entire upper surface of a plate 10a made of hard synthetic resin such as polycarbonate.

The lower circumference of the plate body 8 in the accumulating member 4 is adhered to the edge 31e of the accumulating member mounting part 31b in the reflecting member 3. The upper side of the mounting member 10 is adhered to the periphery of the penetration hole 31d at the back side of the reflecting member 3, and is further adhered to the back side of the accumulating member 4 adhered to the edge 31e of the accumulating member mounting part 31b through the penetration hole 31d. As a result, the plate body 8 of the accumulating member 4 and the mounting member 10 can be firmly adhered to the periphery of the penetration hole 31d of the reflecting member 3, and the plate body 8 of the accumulating member 4 and the mounting member 10 can be firmly adhered to each other. It is thus effective to prevent the accumulating member 4 from peeling off securely due to poor adhesion of the adhesive between the soft vinyl chloride sheets. Moreover, bending of the reflecting member 3 after adhesion can be securely prevented by the plate body 8 of the accumulating member 4 and the mounting member 10, and peeling of the accumulating member 4 from the periphery due to bending can be securely prevented. Still further, if the accumulating member 4 is not provided with plate body 8, the back side of the accumulating member 4 may be corrugated instead of being flat, and in such a case there is a step difference for the portion of the thickness of the edge 31e of the reflecting member 3 between the accumulating member 4 and mounting member 10, and the entire back side of the accumulating member 4 may not uniformly adhere to the mounting member 10, but when the plate body 8 is provided as in this embodiment, the entire surface of the plate body 8 can be adhered to the mounting member 10, so that the adhesion may be stronger. Thus formed light reflecting and accumulating member of the embodiment, like the fifth embodiment, may be arranged by adhering plural accumulating members at proper intervals to a slender reflecting member 3, so that it may be used as suspenders 100 as shown in FIG. 9(A), or as a vest 101 in FIG. 9(B), or as a cap fastener.

Figure 11:
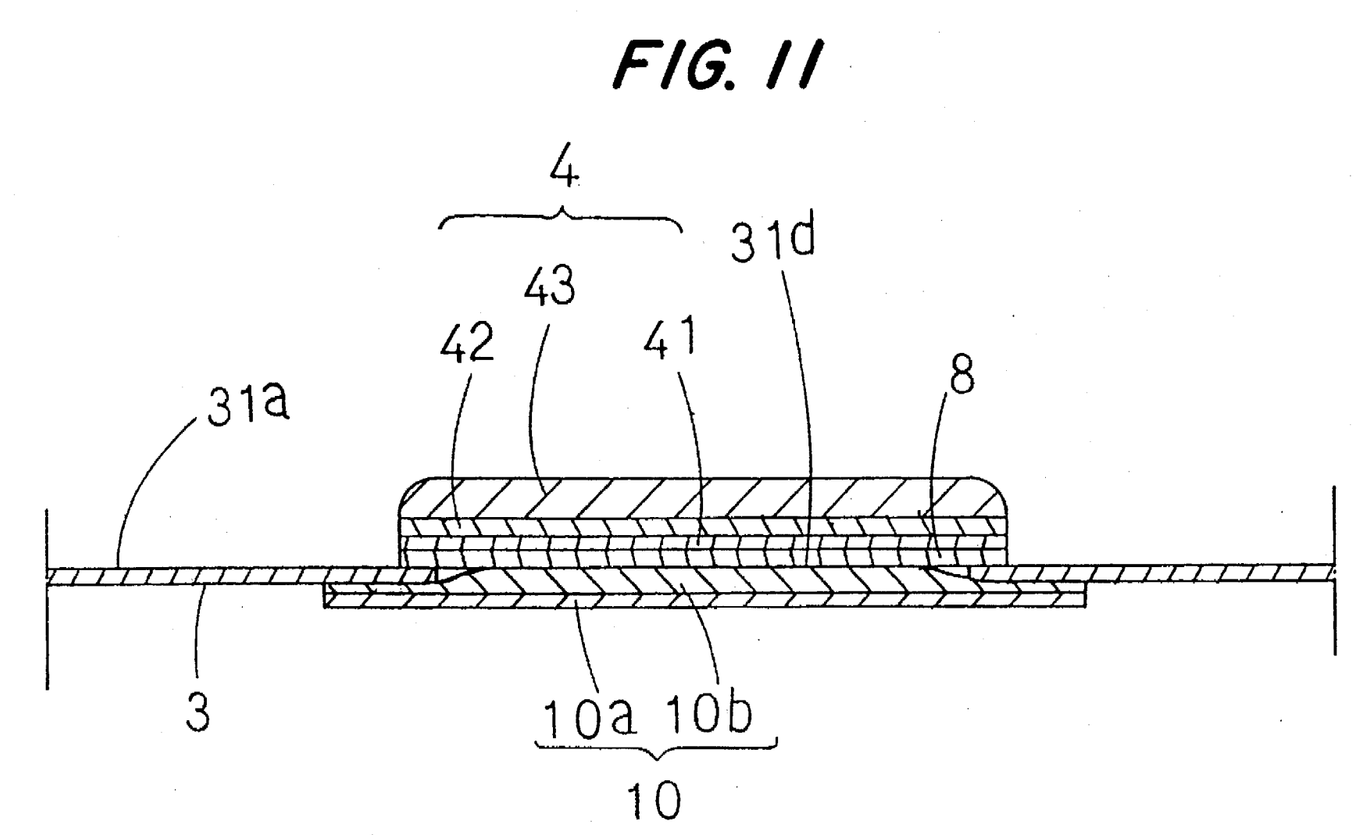
FIG. 11 is an essential sectional view through a midline extending through a light reflecting and accumulating member according to a seventh embodiment.

FIG. 11 relates to a seventh embodiment. This embodiment, like the sixth embodiment, is composed of a reflecting member 3, an accumulating member 4, and a plate form mounting member 10, but the reflecting member 3 is formed of a reflecting area 31a of recurrent reflection by glass beads provided on the surface of a cloth member. The reflecting member 3 also has a penetration hole 31d penetrating from the upper side to the lower side. On the other hand, the accumulating member 4 is formed in a large size than the diameter of the penetration hole 31d of the reflecting member 3, and a plate body 8 is adhered to the entire back side of a soft vinyl chloride sheet 41 having an accumulating layer 42 covered with a transparent UV resin 43 on the surface. The mounting member 10 is formed in a further larger diameter than the accumulating member 4, and an adhesive layer 10b of elastic rubber is formed on the entire surface of a plate 10a made of hard synthetic resin such as polycarbonate.

The lower periphery of the plate body 8 in the accumulating member 4 is adhered to the entire periphery of the penetration hole 31d in the reflecting member 3. The upper side of the mounting member 10 is adhered to the entire periphery of the penetration hole 31d at the back side of the reflecting member 3, and is further adhered to the back side of the accumulating member 4 adhered to the reflecting member 3 through the penetration hole 31d. In this constitution, since the reflecting member 3 is composed of a cloth member, when the accumulating member 4 is merely adhered on the surface, it is likely to peel off, but it can be prevented, and the accumulating member 4 can be firmly adhered to the reflecting member 3. Besides, when the reflecting member 3 is made of a cloth member, it is stretched and elongated when folding the reflecting member 3, and the periphery of the accumulating member 4 is likely to peel off the reflecting member 3, but since the mounting member 10 is larger than the diameter of the accumulating member 4, elongation of the reflecting member 3 in the periphery of the accumulating member 4 can be prevented, and peeling of the reflecting member 3 from the periphery of the accumulating member 4 can be prevented. Thus formed light reflecting and accumulating member of the embodiment is suited as suspenders 100 or vest 101 as mentioned above by forming the reflecting member 3 in a slender form, and adhering plural accumulating members 4 at proper intervals.

The mounting member 10 in the sixth and seventh embodiments may not be limited to the adhesive layer 10b made of rubber, but an adhesive layer may be directly applied to the upper surface of the plate 10a to form a layer. The thickness of the plate 10a of the mounting member 10 is about 0.15 mm in the foregoing embodiments, but it is not particularly defined. In FIG. 1 or FIG. 4, meanwhile, when using the stopping member 2 having a plate form connection piece 21a, the connection piece 21a functions as the mounting member 10, and the connection piece 21a can be adhered to the lower side of the accumulating member 4 through the penetration hole 31d. The accumulating member 4, when provided with the plate body 8 as mentioned above, is preferable because the entire surface can be securely adhered to the mounting member 10 if there is a step difference, but not limited to this form, without forming plate body 8, the soft vinyl chloride sheet 41 having the accumulating layer 42 maybe directly adhered to the edge 31e of the reflecting member 3 and the mounting member 10. In this case, the adhesion between the accumulating member 4 and the reflecting member 3 is poor if the both are soft vinyl chloride sheets, but since the reflecting member 3 is adhered to the mounting member 10, the accumulating member 4 can be firmly fitted. Or, as mentioned above, when the accumulating member 42 is directly printed on the plate body 8, the soft vinyl chloride sheet 41 is not needed. On the other hand, the edge 31e of the reflecting member 3 is preferred in that the accumulating member 4 can be securely adhered if provided on the entire periphery of the penetration hole 31d, but it may be also provided partially, and in such a case, too, the accumulating member 4 is not peeled off because of the mounting member 10. The size of the penetration hole 31d is not particularly defined, it may be free as far as the accumulating member 4 and mounting member 10 can be adhered. To form the penetration hole 31d, in the case of the sixth embodiment, it may be formed by cutting the middle after forming the accumulating member mounting part 31b and stopping member mounting part 31c as in the other foregoing embodiments, but when forming the accumulating member mounting part 31b and stopping member mounting part 31c by pressing the die 5, it may be formed simultaneously with the accumulating member mounting part 31b and others by making use of the heat of the die, and hence it can be done without increasing the number of steps. In the seventh embodiment, moreover, the reflecting member 3 may not be composed of cloth, but may be made of other proper material.

In the embodiments shown in FIG. 1 through FIG. 7, the stopping means is the stopping member 2 composed of a stopping piece 22 and connection piece 21a, and hence it can be easily, securely, and detachably attached to the cap, boots, skirt, other clothes, bag or belongs, bicycle spoke or mud cover, fire extinguisher, etc., but is not limited to these modes, for example, the light reflecting and accumulating member may be suspended by a key holder, rope member or the like, or may be directly adhered to the member to be mounted by forming an adhesive layer by applying an adhesive to the back side of the reflecting member 3. Or, without using the elastic member 33, as shown in FIG. 8, the reflecting member 3 may be composed of a sheet member 31 made of soft vinyl chloride sheet forming a reflecting area 31a on the entire surface, and a sheet member 32 made of soft vinyl chloride sheet adhered to the back side of the sheet member 31.

The use of the light reflecting and accumulating member of the invention is not limited to the examples listed above, but may include, for example, tag, clip, emblem, badge, belt, suspenders, arm band, vest, wrist band, name tag, waist pouch, briefcase, backpack, gloves, hair band, shoes, raincoat, umbrella, tape, and sandals, and it may be properly re-used. For example, when used as suspenders as shown in FIG. 9(A), the main body 1 is used as stopping means, and it is stopped when the main body 1 is applied on the shoulders. In such a case, the stopping member 2 is not needed, and the reflecting member 3 does not require stopping member mounting part 31c.

Characters or patterns can be printed on the surface of the accumulating member 4, on the UV resin or epoxy resin, or on the surface of the accumulating layer 42 at the lower side. Similarly, characters or patterns can be printed on the surface of the reflecting member 3.

In the first aspect of the invention, as described so far in the embodiments, when the light of a car is projected to the reflecting area, it is reflected and the existence can be easily recognized from the car even in the nighttime, and if the light is not projected straightly from the front of the reflecting area and the reflection efficiency is poor, the accumulating area emits the accumulated light, so that the existence can be easily recognized. It is hence suited for traffic safety.

Moreover, since the location can be easily recognized even in darkness by the accumulating areas for examples by attaching to the fire alarm or fire extinguisher, it is seen in the darkness and the position of the fire alarm or fire extinguisher can be recognized, which is suited for disaster prevention. On the other hand, by the accumulating areas the user instantly knows by seeing it that the safety from car or the like is guaranteed by wearing it, so that the user is willing to wear for traffic safety. Thus, the frequency of use for traffic safety increases, and it is more suited for traffic safety.

In the second aspect of the inventions the peripheral edge of the accumulating member fitted to the accumulating member mounting part is sunk from the surface of the reflecting member, and therefore other parts are not caught on the peripheral edge of the accumulating member, while the accumulating member and reflecting member hardly peel off each other. Hence, even by plural times of use, peeling is rare, and the commercial value is high.

In the third aspect of the invention, in addition to the effects of the first and second aspect, by fitting the periphery of a transparent value wider in surface area than the accumulating member to the reflecting members, the accumulating member can be disposed between the transparent body and reflecting member, so that the accumulating member is not peeled off the reflecting member. In the fourth aspect of the invention, in addition to the effects of the second and third aspects, for example, when the accumulating member comprises an accumulating layer formed on the surface of soft vinyl chloride sheet, and it is directly adhered to the reflecting member made of soft vinyl chloride sheet, it is free from the problems of peeling of the accumulating member due to poor adhesion by the adhesive, bending of the entire piece after adhesion, and peeling from the periphery when the adhered accumulating member is bent, and moreover, in the embodiment, when the plate body of hard synthetic resin is interpreted between soft vinyl chloride sheets, the adhesion by the adhesive is enhanced, and bending after adhesion is prevented, thereby avoiding peeling from the periphery due to bending. In the fifth aspect of the invention, the peripheral edge of the connection piece of the stopping member is sunk from the back side of the reflecting member over the entire circumference, and hence other parts are hardly caught on the peripheral edge of the connection piece fitted to the stopping member mounting part, and the connection piece and reflecting member hardly peel off each other. As a result, the stopping member and reflecting member can be easily adhered with adhesive, and peeling hardly occurs by plural times of use, so that the commercial value may be higher. Besides, together with the plate body, bending of the accumulating member after adhesion can be securely prevented, and peeling from the periphery due to bending can be securely prevented.

In the sixth and seventh embodiments, the accumulating member fitted to the accumulating member mounting part of the reflecting member is further fitted through the penetration hole from the back side of the reflecting member by the plate form mounting plate, and therefore peeling due to defective adhesion of the accumulating member or peeling due to bending can be securely prevented. Or, by fitting the accumulating member to the accumulating member mounting part sunk from the surface of the reflecting member as in the seventh aspect, other parts are more hardly caught on the peripheral edge of the accumulating member, so that the accumulating member and reflecting member hardly peel off each other.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A light reflecting and accumulating member comprising:

a reflecting member having a reflecting area capable of reflecting incident light by projecting a ray of light at least to part of a front surface of the reflecting member;

an accumulating member having an accumulating area for absorbing and accumulating the incident light, and also capable of emitting light by gradually releasing accumulated light; and a plate-shaped mounting member, wherein the reflecting member has a penetration hole penetrating from the front surface to a back side of the reflecting member, a back side of the accumulating member is fitted to a periphery of the penetration hole, and one side of the mounting member is fitted to the periphery of the penetration hole at the back side of the reflecting member, and is also fitted to the back side of the accumulating member fitted to the reflecting member through the penetration hole.

2. A light reflecting and accumulating member comprising:

a reflecting member having a reflecting area capable of reflecting incident light by projecting a ray of light at least to part of a front surface of the reflecting member;

an accumulating member having an accumulating area for absorbing and accumulating the incident light, and also capable of emitting light by gradually releasing accumulated light; and a plate-shaped mounting member, wherein an accumulating member mounting part is provided on the front surface of the reflecting member, being formed so as to be sunk from the front surface, and the reflecting area is provided at a side of the accumulating member mounting part, the accumulating member mounting part is provided with a penetration hole penetrating from the front surface to a back side of the reflecting member, and an edge formed on the periphery of the penetration hole, a back side of the accumulating member is fitted to the edge of the accumulating member mounting part so as to sink from the front surface of the reflecting member over the entire circumference, and one side of the mounting member is fitted to the periphery of the penetration hole at the back side of the reflecting member, and is also fitted to the back side of the accumulating member fitted to the accumulating member mounting part through the penetration hole.

3. A light reflecting and accumulating member comprising:

a reflecting member including a front sheet and a back sheet spaced-apart from one another and with an elastic material disposed therebetween, said front sheet including a front depression formed therein, said back sheet including a back depression formed therein, said front sheet further having a reflecting area capable of reflecting incident light by projecting a ray of light at least to part of the front surface of the reflecting member;

an accumulating member having an accumulating area for absorbing and accumulating the incident light, and also capable of emitting light by gradually releasing accumulated light;

an accumulating member mounting part provided in the front depression of the reflecting member, the reflecting area being provided at a side of the accumulating member mounting part, a back side of the accumulating member being attached to the accumulating member mounting part of the reflecting member, and thereby a peripheral edge of the accumulating member sinks from the front surface of the reflecting member over an entire perimeter of the accumulating member;

an attachment device provided at a back side of the reflecting member, the attachment device including an attachment piece for detachably attaching the light reflecting and accumulating member to an object, the attachment device further including an attachment member having a connection piece to be connected to the reflecting member; and an attachment member mounting part provided in the back depression of the reflecting member, the connection piece of the attachment member being fitted to the attachment member mounting part of the reflecting member so that a peripheral edge of the connection piece sinks from a back surface of the reflecting member over an entire perimeter of the connection piece.

4. The light reflecting and accumulating member according to claim 3, further comprising:

a transparent material covering an exposed surface of the accumulating member, the transparent material extending at least partially onto the reflecting member to inhibit the accumulating member from being peeled off of the accumulating member mounting part.

5. The light reflecting and accumulating member according to claim 4, wherein the transparent material extends over substantially all of the front surface of the reflecting member.

6. The light reflecting and accumulating member according to claim 3, wherein said accumulating member includes a substantially rigid plate body at said back side of the accumulating member, said plate body being attached to the accumulating member mounting part of the reflecting member, and thereby a peripheral edge of the plate body sinks from the front surface of the reflecting member over an entire perimeter of the plate body.

7. The light reflecting and accumulating member according to claim 6, wherein said plate body is made of polycarbonate.

8. The light reflecting and accumulating member according to claim 6, wherein said plate body is made of metal.

9. The light reflecting and accumulating member according to claim 3, wherein said attachment piece includes a pivoting pinching element for detachably attaching the light reflecting and accumulating member to said object.

10. The light reflecting and accumulating member according to claim 3, wherein said attachment device includes a safety pin for detachably attaching the light reflecting and accumulating member to said object.

11. The light reflecting and accumulating member according to claim 3, wherein said front sheet and said back sheet are made of vinyl chloride.

12. A light reflecting and accumulating member comprising:

a reflecting member including a front sheet and a back sheet spaced-apart from one another with at least one substantially rigid plate body disposed therebetween, said front sheet including at least one front depression formed therein, said front sheet further having a reflecting area capable of reflecting incident light by projecting a ray of light at least to part of the front surface of the reflecting member;

at least one accumulating member having an accumulating area for absorbing and accumulating the incident light, and also capable of emitting light by gradually releasing accumulated light; and an accumulating member mounting part provided in each front depression of the reflecting member, the reflecting area being provided at a side of the accumulating member mounting part, a back side of each accumulating member being attached to a respective accumulating member mounting part of the reflecting member, and thereby a peripheral edge of the accumulating member sinks from the front surface of the reflecting member over an entire perimeter of the accumulating member.

13. The light reflecting and accumulating member according to claim 12, further comprising:

a transparent material covering an exposed surface of each accumulating member, the transparent material extending at least partially onto the reflecting member to inhibit the accumulating member from being peeled off of the accumulating member mounting part.

14. The light reflecting and accumulating member according to claim 12, further comprising suspenders for receiving a plurality of said light reflecting and accumulating members thereon.

15. The light reflecting and accumulating member according to claim 12, further comprising a vest for receiving a plurality of said light reflecting and accumulating members thereon.

16. The light reflecting and accumulating member according to claim 12, wherein said plate body is made of polycarbonate.

17. The light reflecting and accumulating member according to claim 12, wherein said plate body is made of metal.

18. The light reflecting and accumulating member according to claim 12, wherein said front sheet and said back sheet are made of vinyl chloride.

* * * * *